United States Patent
Fuller et al.

(10) Patent No.: US 10,125,988 B2
(45) Date of Patent: Nov. 13, 2018

(54) TWO-STAGE FLUID CONTROL VALVE HAVING A FIRST STAGE MECHANICAL VALVE AND A SECOND STAGE MICROVALVE

(71) Applicant: DunAn Microstaq, Inc., Austin, TX (US)

(72) Inventors: E. Nelson Fuller, Manchester, MI (US); Parthiban Arunasalam, Austin, TX (US); Joe A. Ojeda, Sr., Austin, TX (US)

(73) Assignee: Dunan Microstaq, Inc., Austin, TX (US)

( * ) Notice: Subject to any disclaimer, the term of this patent is extended or adjusted under 35 U.S.C. 154(b) by 130 days.

(21) Appl. No.: 15/297,400

(22) Filed: Oct. 19, 2016

(65) Prior Publication Data

US 2017/0211809 A1    Jul. 27, 2017

Related U.S. Application Data

(60) Provisional application No. 62/286,747, filed on Jan. 25, 2016.

(51) Int. Cl.

| | |
|---|---|
| F16K 25/00 | (2006.01) |
| F23N 1/00 | (2006.01) |
| F16K 31/06 | (2006.01) |
| F16K 31/524 | (2006.01) |
| F16K 99/00 | (2006.01) |
| F16K 37/00 | (2006.01) |

(52) U.S. Cl.
CPC .......... *F23N 1/005* (2013.01); *F16K 31/0675* (2013.01); *F16K 31/52408* (2013.01); *F16K 31/52441* (2013.01); *F16K 37/0041* (2013.01); *F16K 99/0026* (2013.01); *F16K 99/0042* (2013.01); *F23N 1/007* (2013.01); *F23N 2035/18* (2013.01); *F23N 2041/08* (2013.01); *F23N 2900/01001* (2013.01); *F23N 2900/01002* (2013.01)

(58) Field of Classification Search
CPC ...... F23N 1/005; F23N 1/007; F16K 99/0026; F16K 99/0042; F16K 25/005
USPC .......................................................... 137/613
See application file for complete search history.

(56) References Cited

U.S. PATENT DOCUMENTS

| | | | |
|---|---|---|---|
| 3,884,413 A * | 5/1975 | Berquist | F16K 5/12 236/15 A |
| 6,523,560 B1 | 2/2003 | Williams et al. | |
| 6,540,203 B1 | 4/2003 | Hunnicutt | |
| 6,845,962 B1 | 1/2005 | Barron et al. | |
| 7,156,365 B2 | 1/2007 | Fuller et al. | |
| 2007/0251586 A1 * | 11/2007 | Fuller et al. | F04B 27/1804 137/596.16 |

(Continued)

FOREIGN PATENT DOCUMENTS

WO       2014209988 A1       12/2014

*Primary Examiner* — Kevin Lee
(74) *Attorney, Agent, or Firm* — MacMillan, Sobanski & Todd, LLC

(57) ABSTRACT

A two-stage fluid control valve includes a first stage mechanical control valve movable between an open position and a leak-free closed position, and a second stage microvalve configured to control the flow of fluid through a fluid outlet of the two-stage fluid control valve when the first stage mechanical control valve is in the open position.

18 Claims, 18 Drawing Sheets

(56) References Cited

U.S. PATENT DOCUMENTS

2011/0073788 A1* 3/2011 Marcus et al. ...... F16K 99/0001
  251/30.01
2016/0123498 A1* 5/2016 Arunasalam et al. ........................
  F16K 99/0059
  251/30.01

* cited by examiner

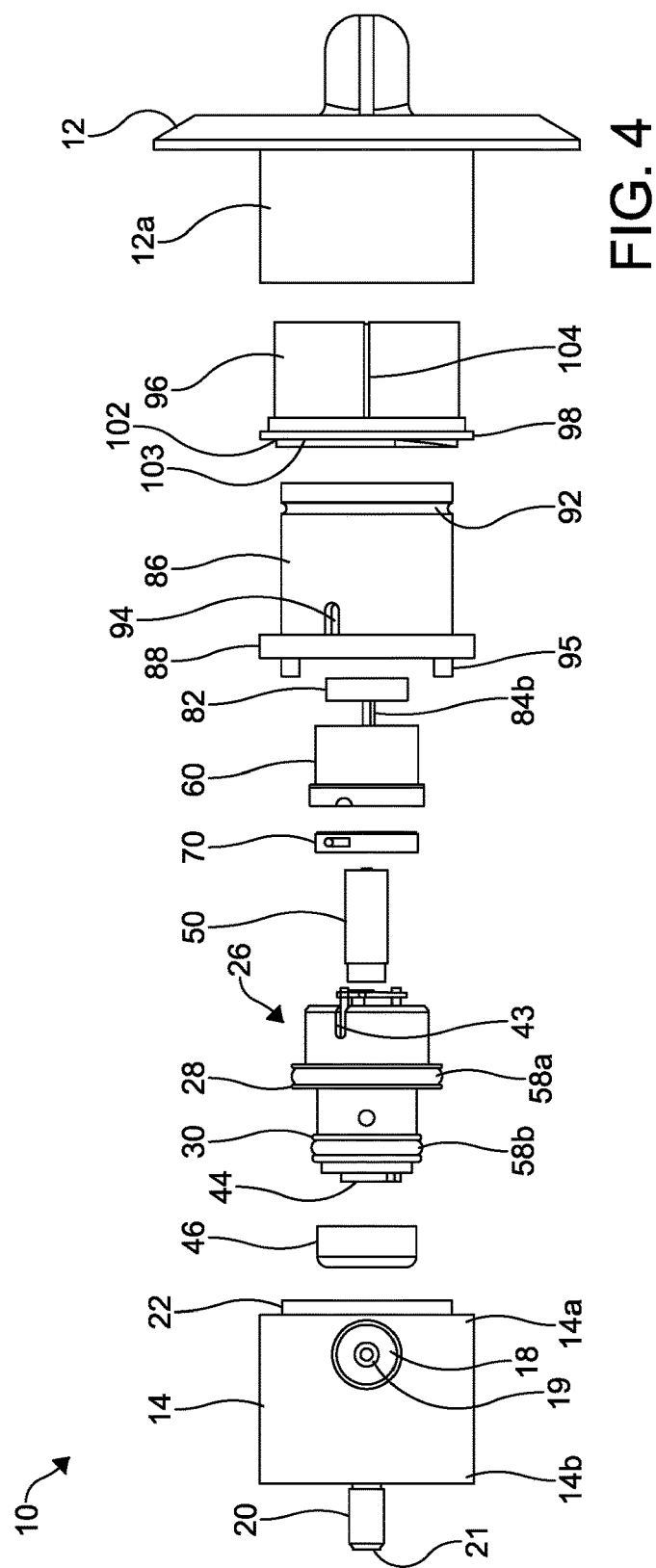

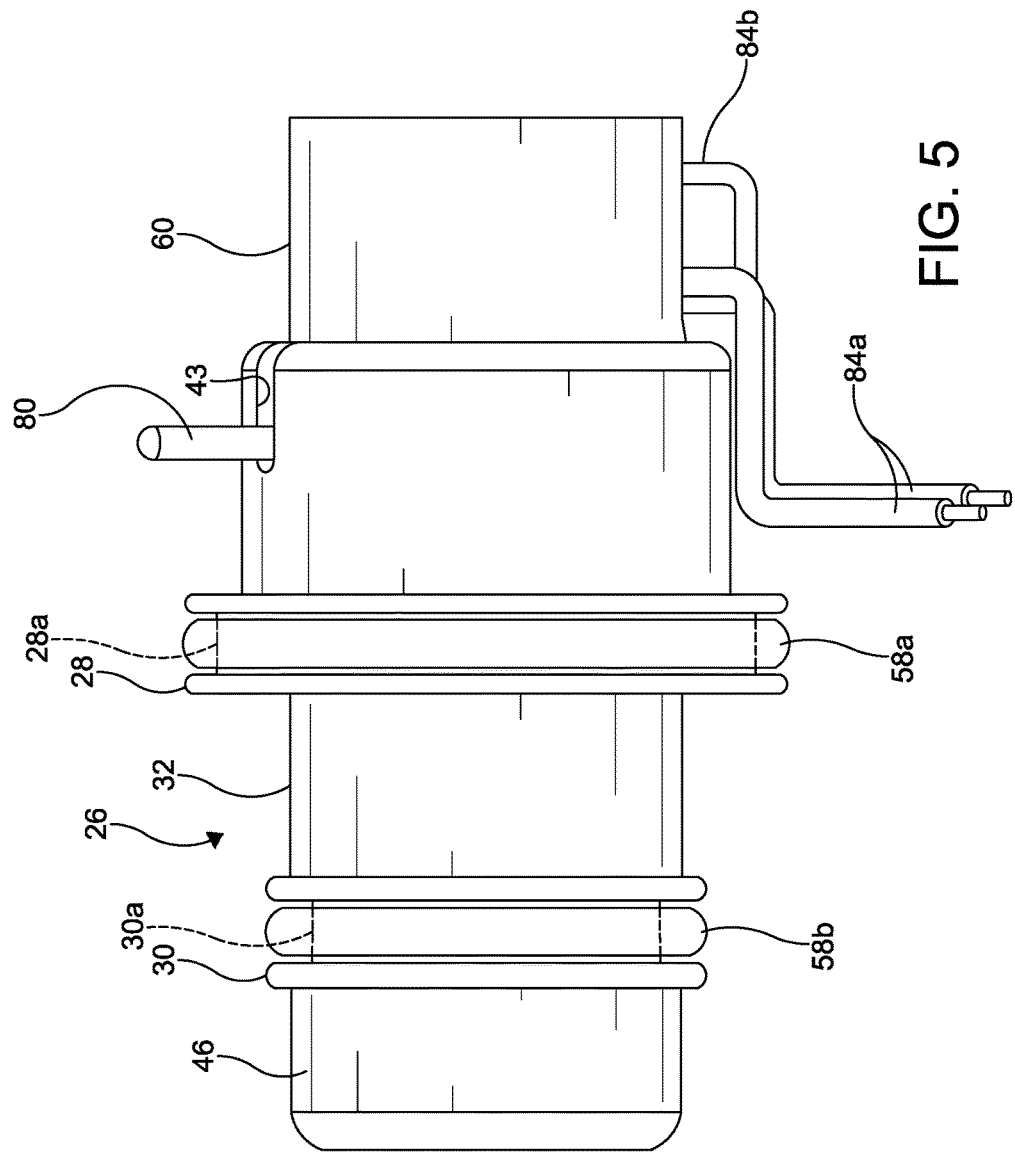

US 10,125,988 B2

TWO-STAGE FLUID CONTROL VALVE HAVING A FIRST STAGE MECHANICAL VALVE AND A SECOND STAGE MICROVALVE

BACKGROUND OF THE INVENTION

This invention relates in general to fluid control valves. In particular, this invention relates to an improved two-stage fluid control valve that includes a first stage mechanical valve and a second stage microvalve, such as for use in a system that requires a positive shut-off function.

MEMS (Micro Electro Mechanical Systems) are a class of systems that are physically small, having features with sizes in the micrometer range, i.e., about 10 µm or smaller. These systems have both electrical and mechanical components. The term "micromachining" is commonly understood to mean the production of three-dimensional structures and moving parts of MEMS devices. MEMS originally used modified integrated circuit (computer chip) fabrication techniques (such as chemical etching) and materials (such as silicon semiconductor material) to micromachine these very small mechanical devices. Today, there are many more micromachining techniques and materials available. The term "micromachined device" as used in this application means a device having some features with sizes of about 10 µm or smaller, and thus by definition is at least partially formed by micromachining. More particularly, the term "microvalve" as used in this application means a valve having features with sizes of about 10 µm or smaller, and thus by definition is at least partially formed by micromachining. The term "microvalve device" as used in this application means a micromachined device that includes a microvalve, and that may include other components. It should be noted that if components other than a microvalve are included in the microvalve device, these other components may be micromachined components or standard sized (larger) components. Similarly, a micromachined device may include both micromachined components and standard sized (larger) components.

Various microvalve devices have been proposed for controlling fluid flow within a fluid circuit. A typical microvalve device includes a displaceable member or valve component movably supported by a body for movement between a closed position and a fully open position. When placed in the closed position, the valve component substantially blocks or closes a first fluid port that is otherwise in fluid communication with a second fluid port, thereby preventing fluid from flowing between the fluid ports. When the valve component moves from the closed position to the fully open position, fluid is increasingly allowed to flow between the fluid ports.

U.S. Pat. Nos. 6,523,560; 6,540,203; and 6,845,962, the disclosures of which are incorporated herein by reference, describe microvalves made of multiple layers of material. The multiple layers are micromachined and bonded together to form a microvalve body and the various microvalve components contained therein, including an intermediate mechanical layer containing the movable parts of the microvalve. The movable parts are formed by removing material from the intermediate mechanical layer (by known micromachined device fabrication techniques, such as, but not limited to, deep reactive ion etching) to create a movable valve element that remains attached to the rest of the part by a spring-like member. Typically, the material is removed by creating a pattern of slots through the material to achieve the desired shape. The movable valve element will then be able to move in one or more directions an amount roughly equal to the slot width.

U.S. Pat. No. 7,156,365, the disclosure of which is also incorporated herein by reference, describes a method of controlling the actuator of a microvalve. In the disclosed method, a controller supplies an initial voltage to the actuator which is effective to actuate the microvalve. Then, the controller provides a pulsed voltage to the actuator which is effective to continue the actuation of the microvalve.

Conventional gas ranges and gas ovens use fluid control valves to control the flow of natural gas or propane to one or more burners on a stovetop and in an oven, respectively. These conventional gas ranges and ovens require precise flame or temperature control and a positive shut-off function in the flow control valve to prevent an unwanted and potentially hazardous flow of natural gas or propane when the gas range or oven burners are in an off position. Additionally, the process of controlling the flow of gas in silicon fabrication, such as in the fabrication of silicon wafers for MEMS microvalves, microchips, and the like, also requires a positive shut-off function to prevent defects in the fabrication process.

Conventional MEMS microvalves are known to provide very accurate fluid flow control, but typically experience a small amount of fluid leakage during normal operation, and are therefore unsuitable as a stand-alone flow control valve for use in a gas range application.

It would therefore be desirable to provide a two-stage fluid control valve having a second stage microvalve combined with a first stage mechanical valve that has an improved positive shut-off function.

SUMMARY OF THE INVENTION

This invention relates to a structure for a two-stage fluid control valve that has an improved positive shut-off function. In one embodiment, the two-stage fluid control valve includes a first stage mechanical control valve movable between an open position and a leak-free closed position, and a second stage microvalve configured to control the flow of fluid through a fluid outlet of the two-stage fluid control valve when the first stage mechanical control valve is in the open position.

In another embodiment, a two-stage burner control valve for a gas range and a gas oven includes a first stage mechanical control valve movable between an open position and a leak-free closed position and a second stage microvalve configured to control the flow of gas through a fluid outlet of the two-stage burner control valve when the first stage mechanical control valve is in the open position.

Various aspects of this invention will become apparent to those skilled in the art from the following detailed description of the preferred embodiments, when read in light of the accompanying drawings.

BRIEF DESCRIPTION OF THE DRAWINGS

FIG. 4 is an exploded elevational view of the improved two-stage fluid control valve illustrated in FIG. 1.

FIG. 5 is an enlarged elevational view of the inner valve body illustrated in FIGS. 2 through 4.

DETAILED DESCRIPTION OF THE PREFERRED EMBODIMENTS

Figure 9:
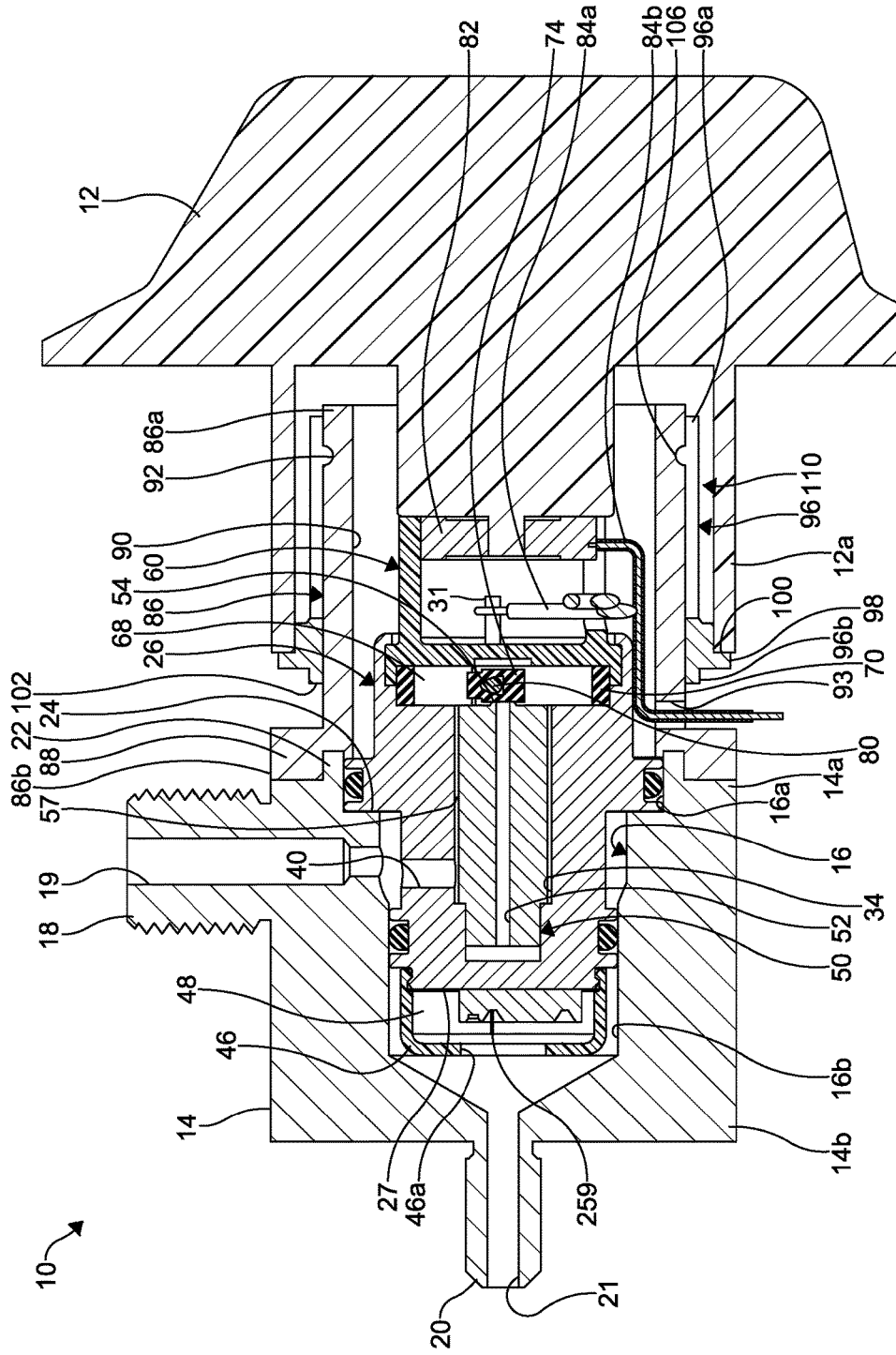
FIG. 9 is a cross-sectional view taken along the line 9-9 of FIG. 8.
Figure 10:
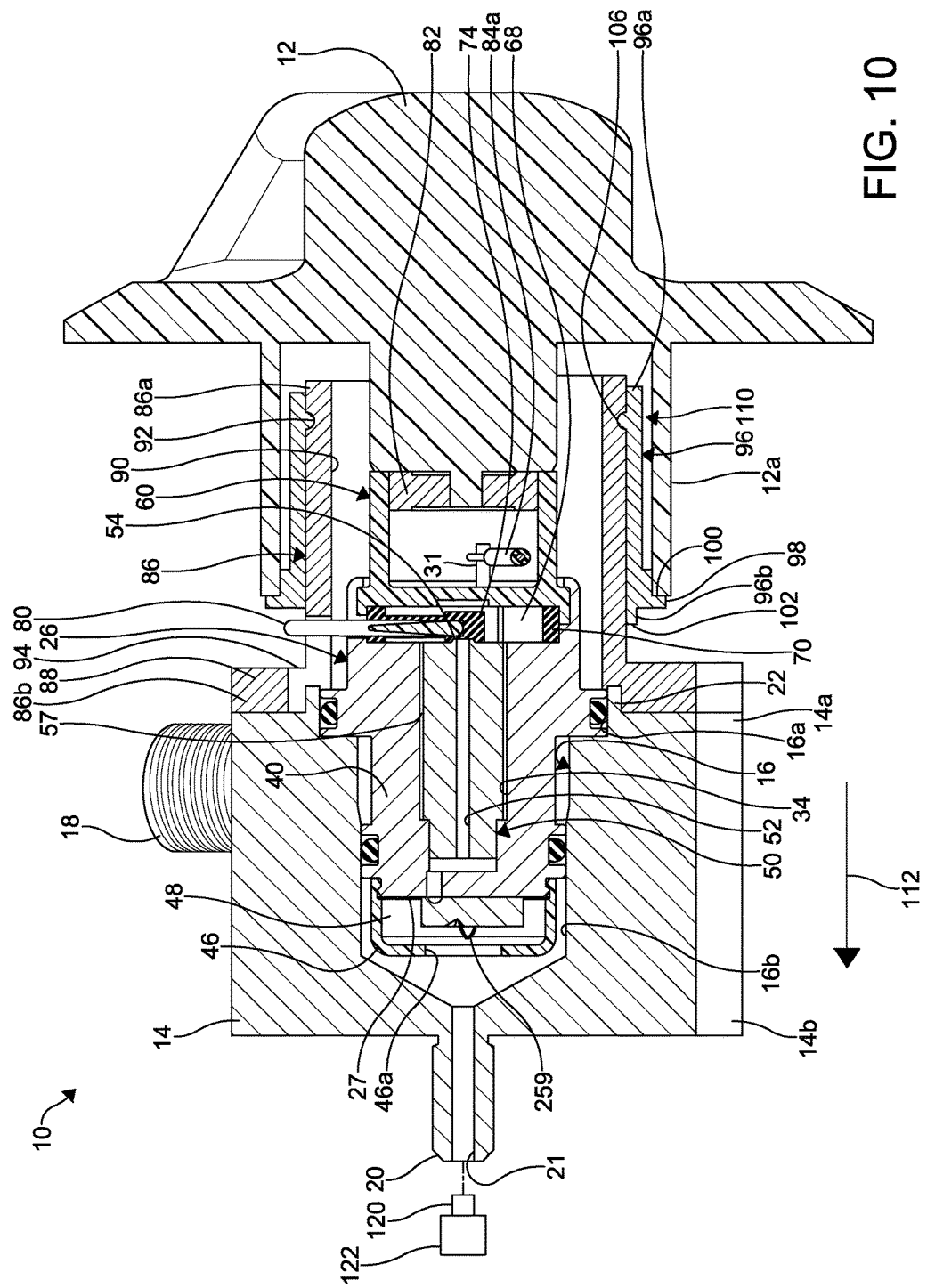
FIG. 10 is a cross-sectional view taken along the line 10-10 of FIG. 8.
Figure 16:
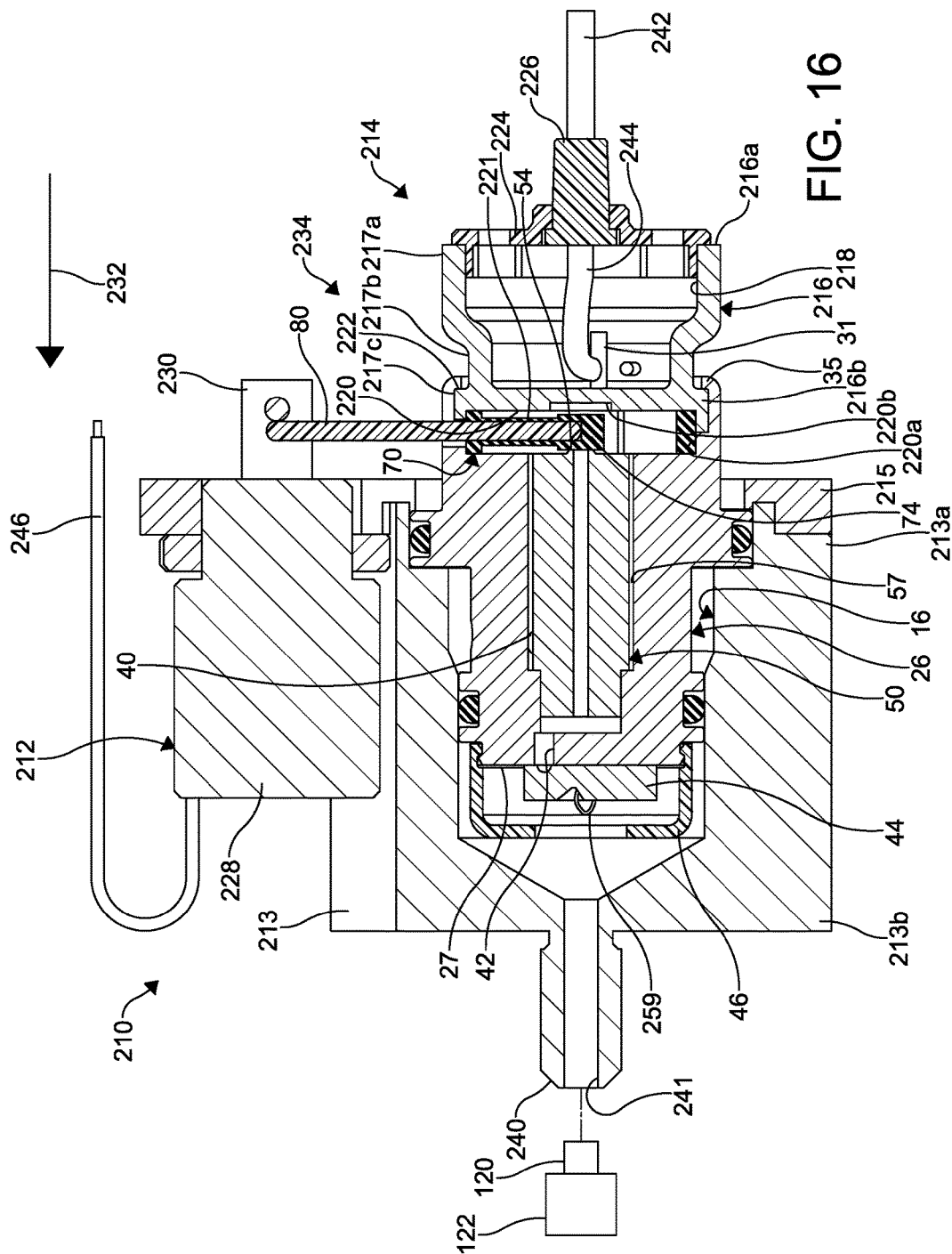
FIG. 16 is a cross-sectional view taken along the line 16-16 of FIG. 15.

This invention relates to an improved structure for a two-stage fluid control valve configured as a burner control valve 10 for a conventional gas range (not shown) or a gas oven 122 (see FIGS. 10 and 16). The burner control valve 10 includes a first stage mechanical valve 110 (see FIGS. 9 and 10) and a second stage microvalve 44, both described in detail below, for use in a system that requires a positive shut-off function, such as a conventional gas range (not shown) or a gas oven 122.

As shown in FIGS. 1 through 9, the burner control valve 10 includes a conventional control knob 12 operatively connected to a first or outer valve body 14. The outer valve body 14 has a substantially rectangular prism shape having a first end 14a and a second end 14b. A substantially cylindrical stepped bore 16 is formed in a first end 14a thereof. The illustrated outer valve body 14 is preferably formed from aluminum. Alternatively, the outer valve body 14 may be formed from any desired metal, metal alloy, and non-metal material, such as plastic. If desired, the outer valve body 14 may be die cast.

A fluid inlet fitting 18 may extend outwardly from the outer valve body 14 and defines a fluid inlet 19. An outlet fitting 20 may extend outwardly from the outer valve body 14 and defines a fluid outlet 21. The fluid inlet 19 and the fluid outlet 21 are in fluid communication with the bore 16. If desired, the inlet and outlet fittings 18 and 20, respectively, may be attached to the outer valve body 14 by a threaded connection. Additionally, the inlet and outlet fittings 18 and 20 may have external threads.

As shown in FIGS. 9 and 10, an annular wall 22 extends outwardly from a surface of the first end 14a of the outer valve body 14 about a first end of the bore 16. A shoulder 24 is defined between a first diameter portion 16a and a second diameter portion 16b of the bore 16, wherein the first diameter portion 16a is larger than the second diameter portion 16b.

Figure 1:
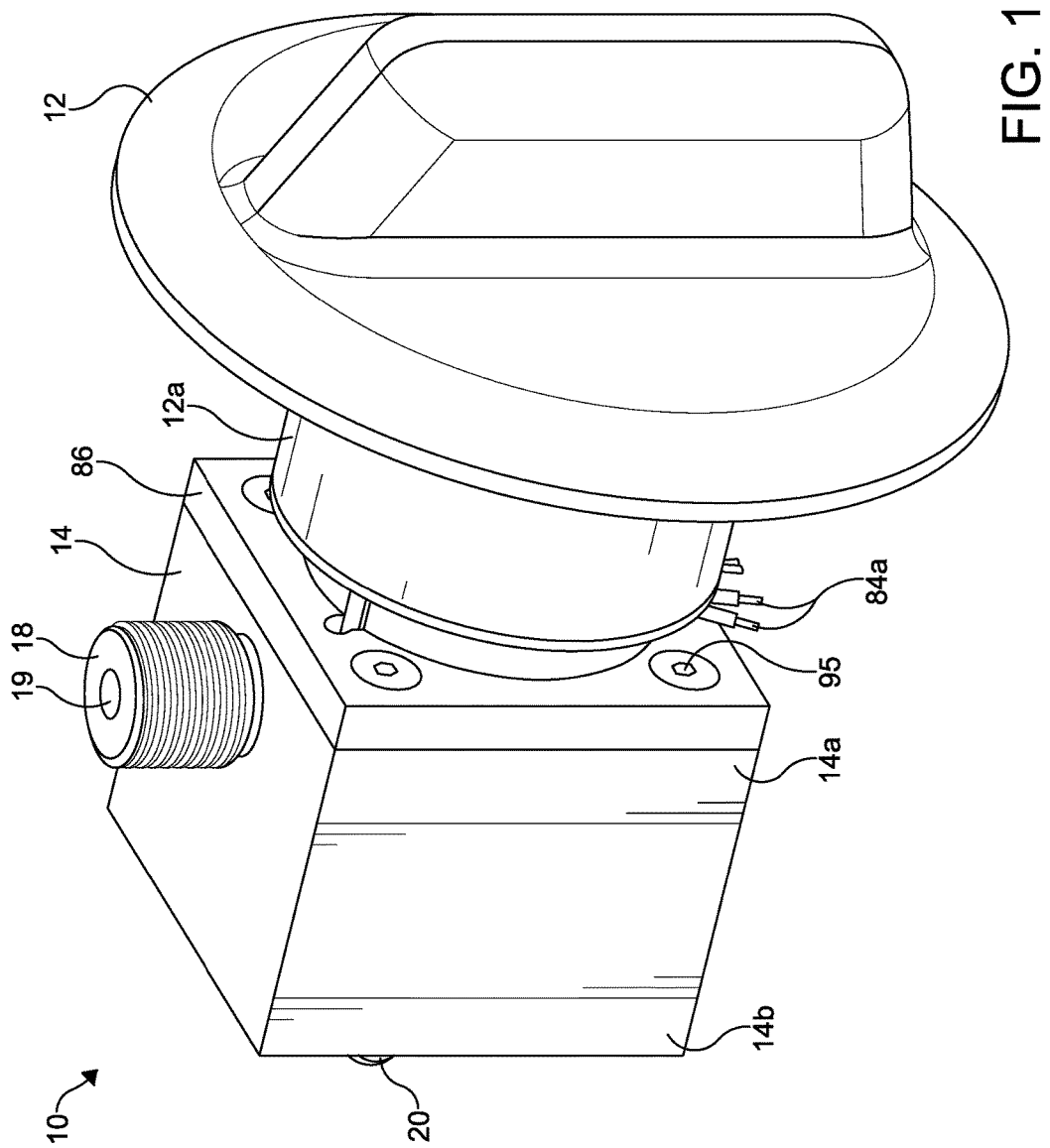
FIG. 1 is a perspective view of a first embodiment of an improved two-stage fluid control valve in accordance with this invention.
Figure 2:
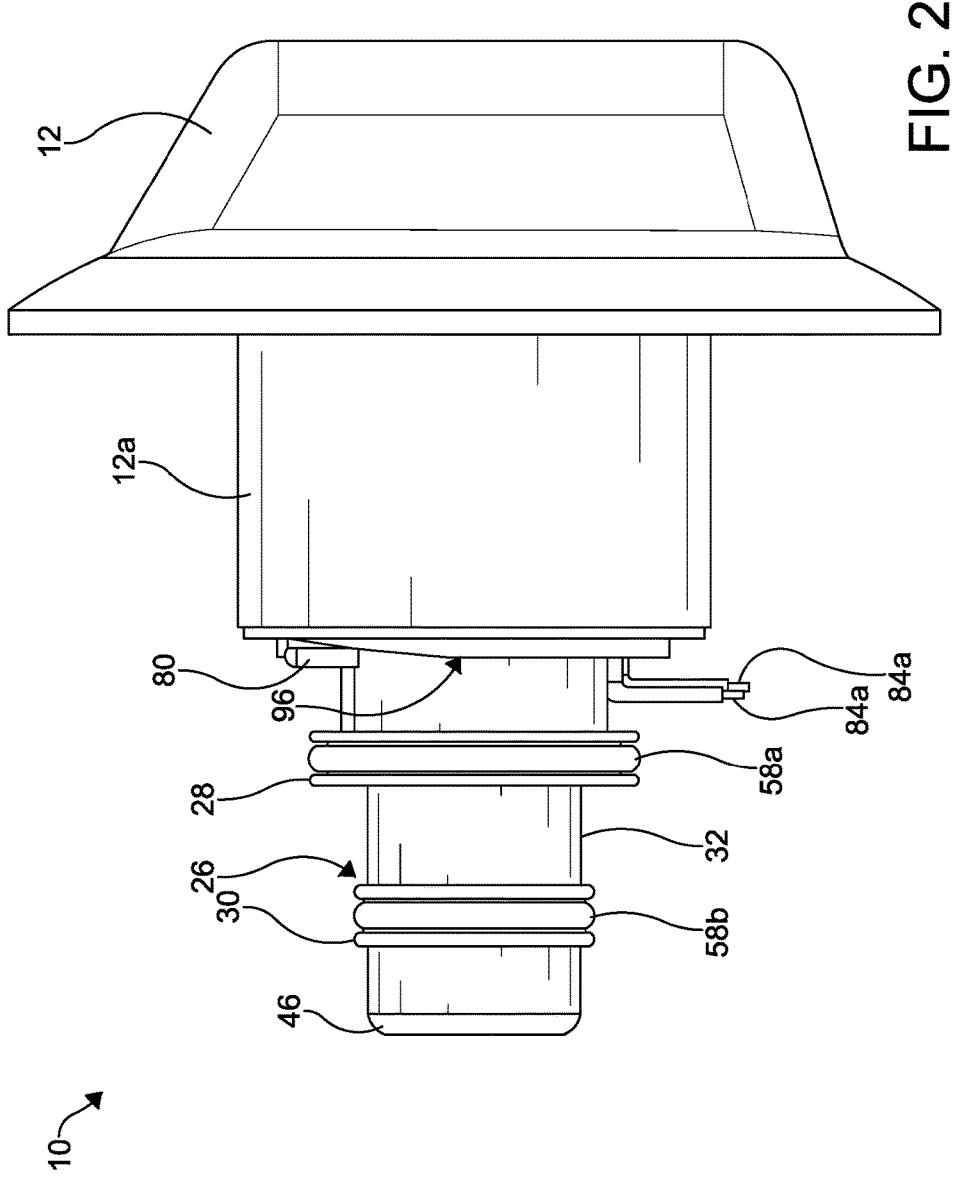
FIG. 2 is a side view of the improved two-stage fluid control valve illustrated in FIG. 1 shown with the valve body removed.
Figure 3:
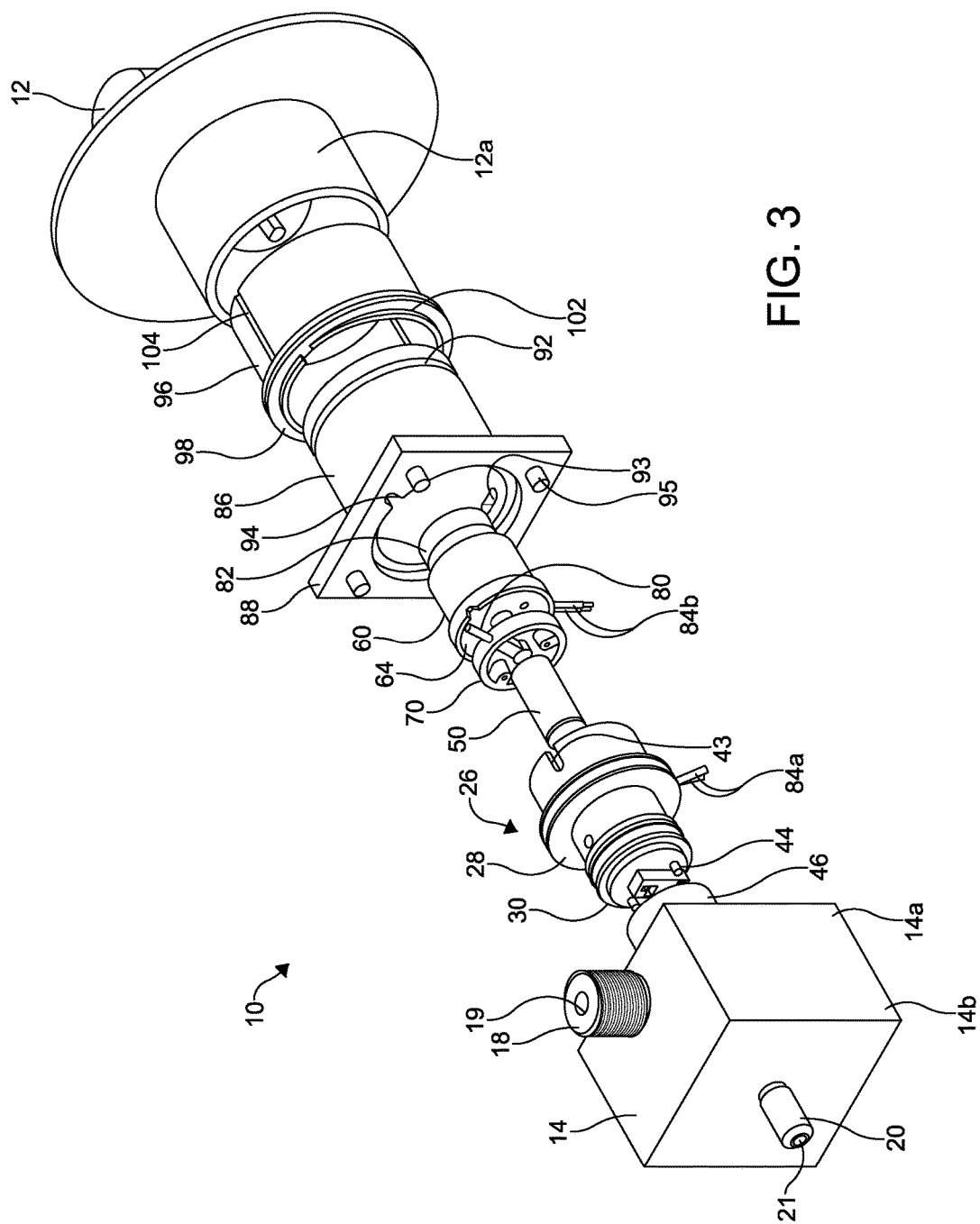
FIG. 3 is an exploded perspective view of the improved two-stage fluid control valve illustrated in FIG. 1.
Figure 5A:
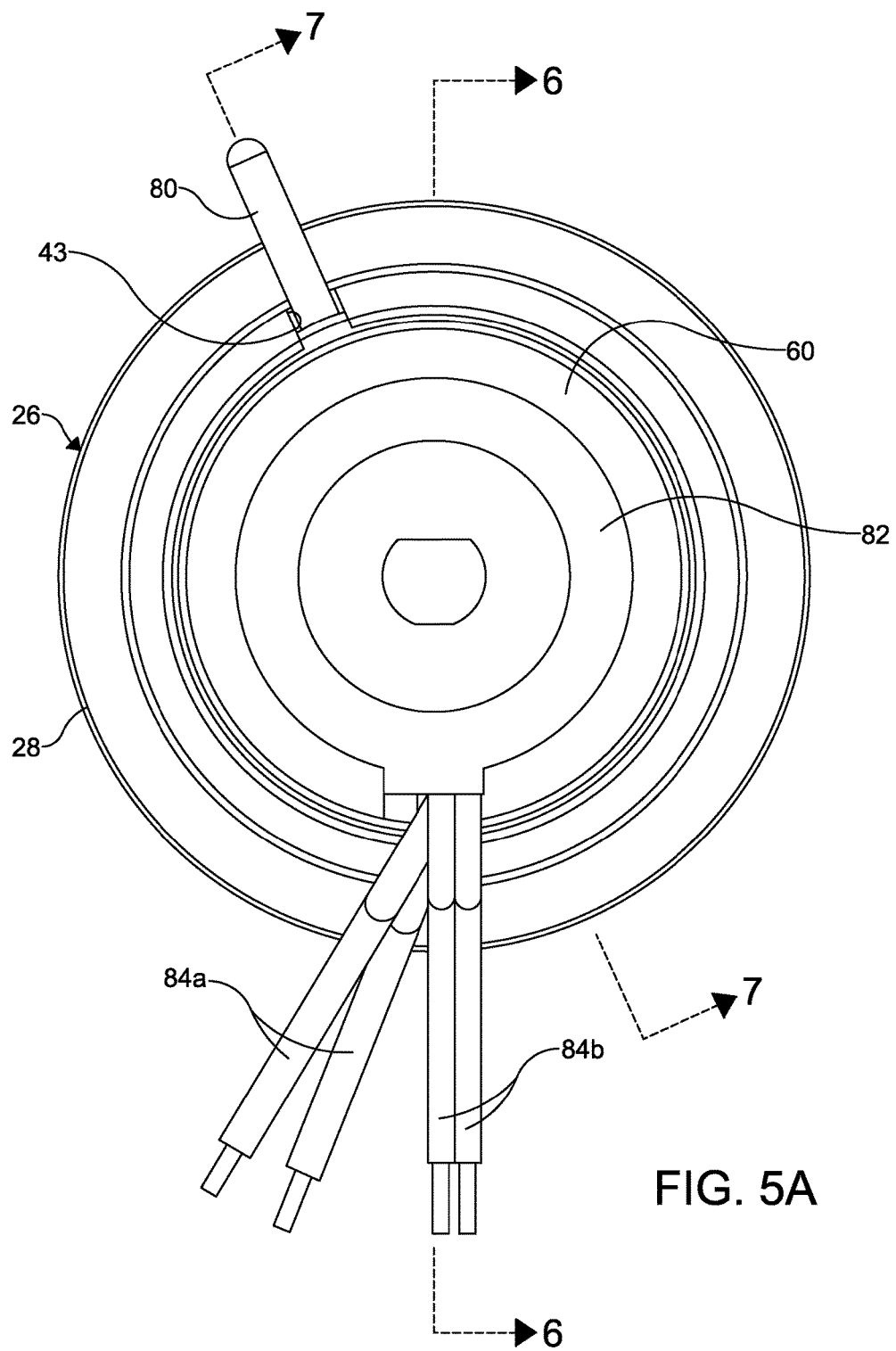
FIG. 5A is an end view of a first end of the inner valve body and the cup-shaped cap illustrated in FIGS. 2 through 5.
Figure 5B:
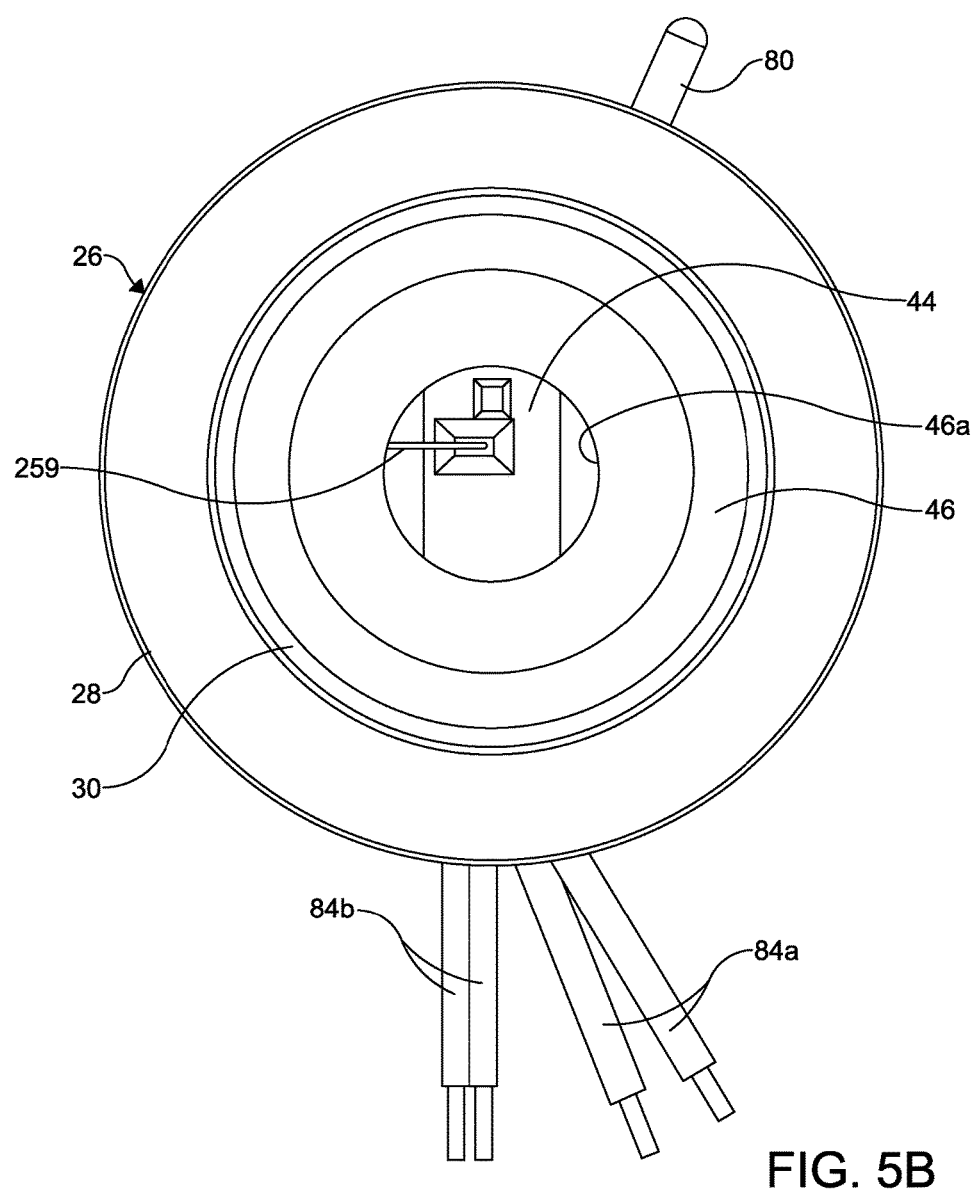
FIG. 5B is an end view of a second end of the inner valve body and the electrical cap illustrated in FIGS. 2 through 5.
Figure 6:
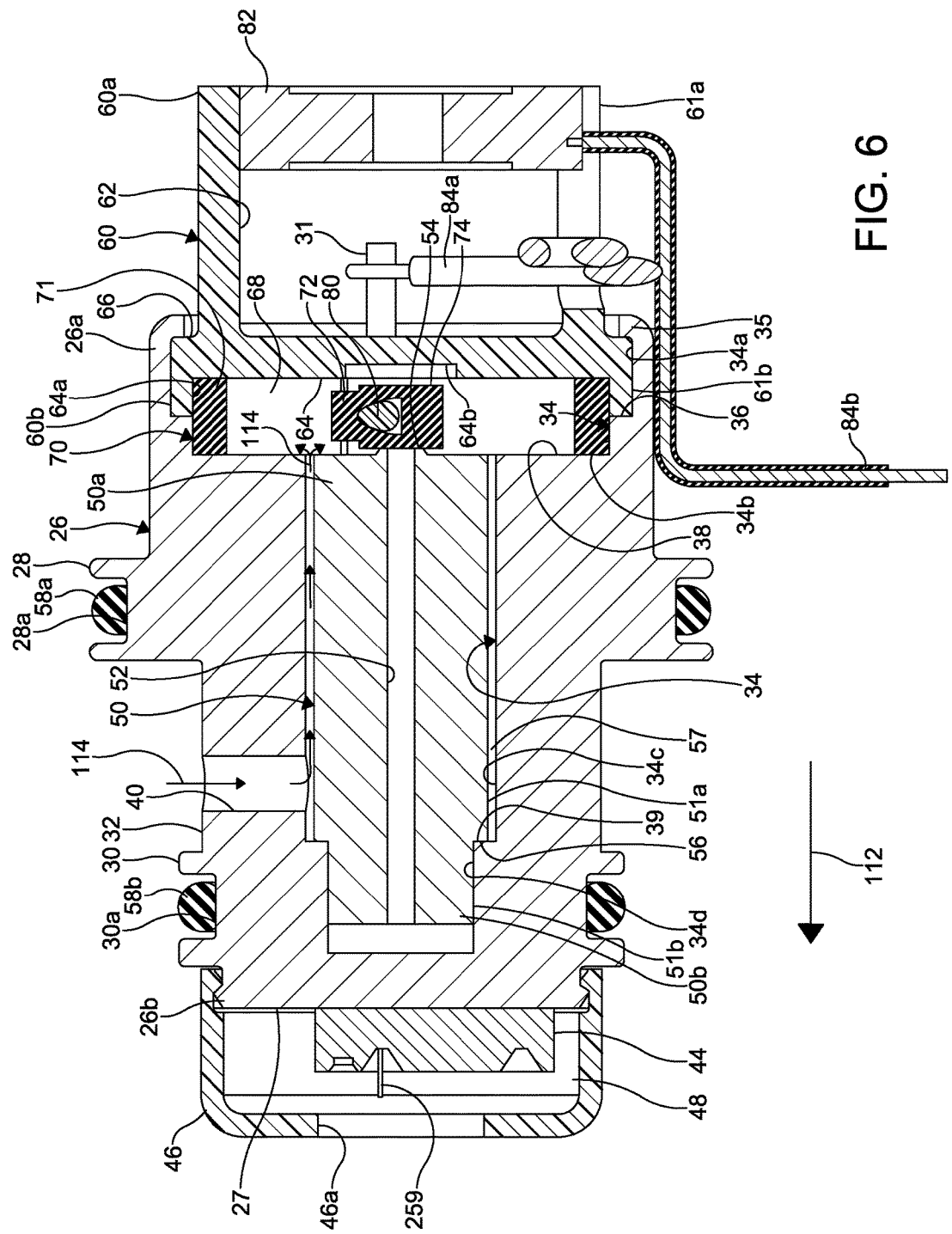
FIG. 6 is a cross-sectional view taken along the line 6-6 of FIG. 5A showing the first stage mechanical valve in a closed position.
Figure 7:
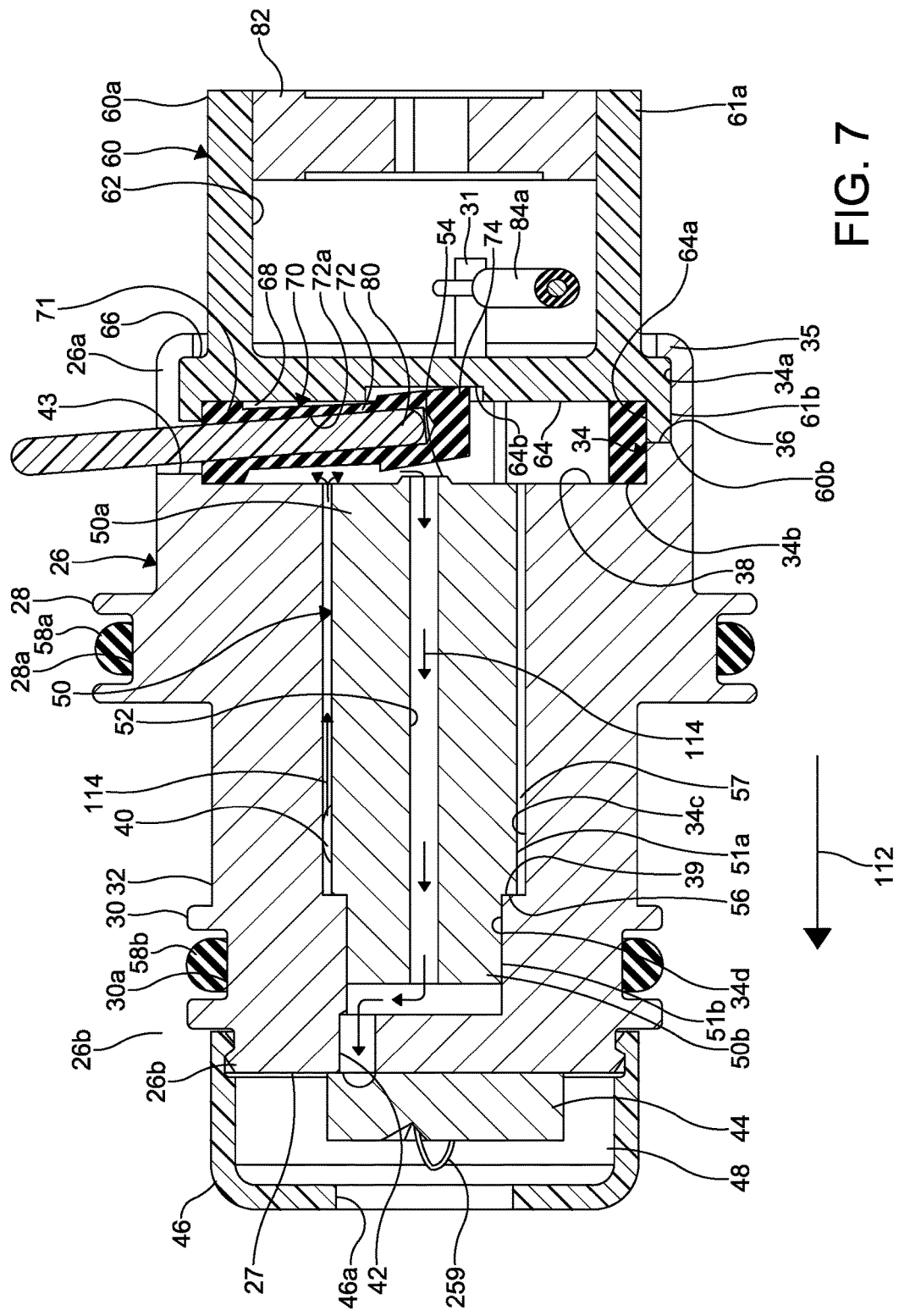
FIG. 7 is a cross-sectional view taken along the line 7-7 of FIG. 5A showing the first stage mechanical valve in an open position.
Figure 8:
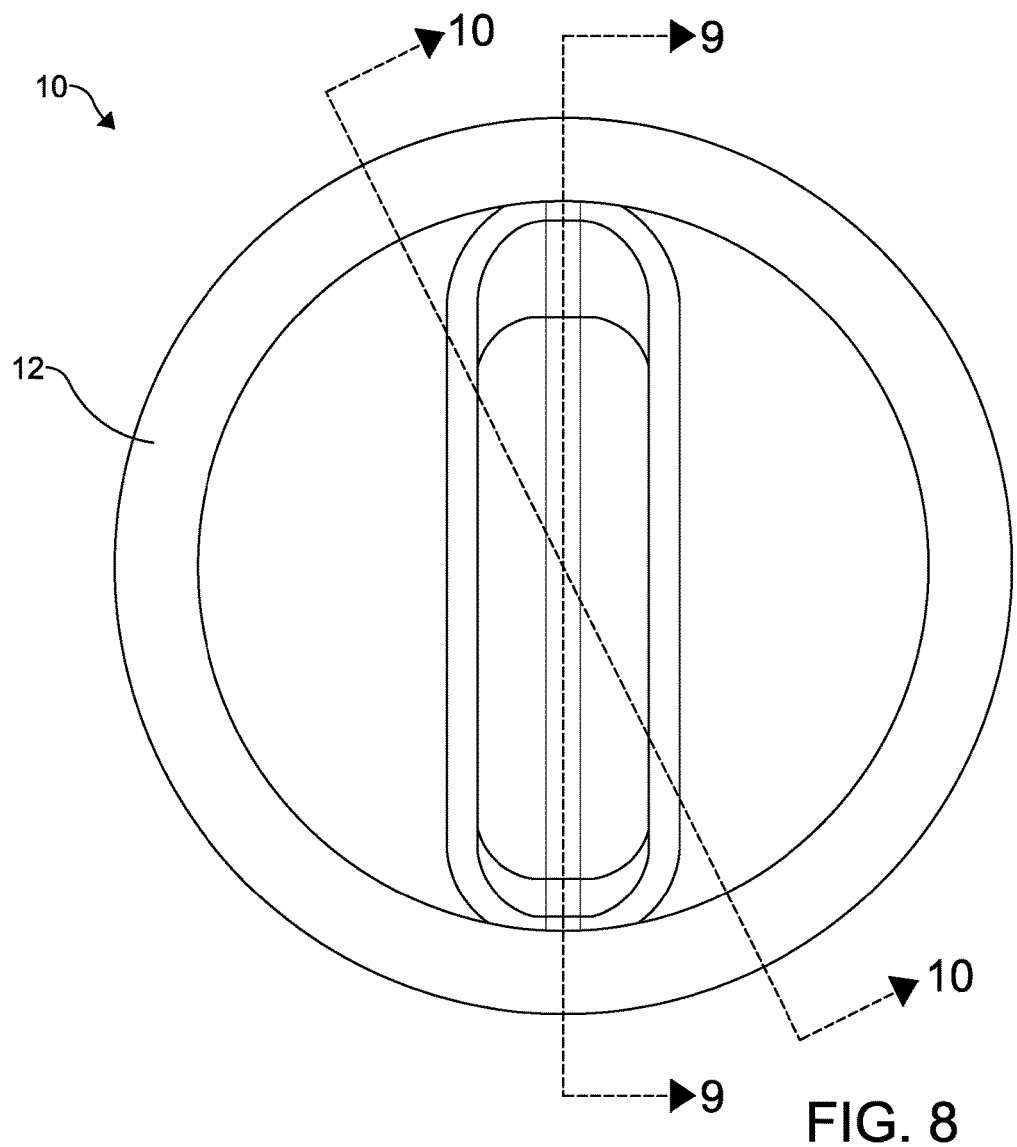
FIG. 8 is an end view of the improved two-stage fluid control valve illustrated in FIGS. 1 through 4.

As best shown in FIGS. 6 and 7, a second or inner valve body 26 is mounted within the bore 16. The inner valve body 26 is substantially cylindrical in shape and defines a housing for a valve seat member 50, and a mounting surface 27 for the microvalve 44, both of which are described below. A first circumferentially extending sealing portion 28 is formed on an outside surface of the inner valve body 26 and defines a first circumferentially extending sealing groove 28a. A second circumferentially extending sealing portion 30 is also formed on an outside surface of the inner valve body 26 and defines a second circumferentially extending sealing groove 30a. A circumferentially extending fluid flow groove 32 is formed in an outside surface of the inner valve body 26 between the first and second sealing portions 28 and 30.

A first annular seal 58a, such as an O-ring, may be disposed within the first circumferentially extending sealing groove 28a. Similarly, a second annular seal 58b, such as an O-ring, may be disposed within the second circumferentially extending sealing groove 30a.

Electrical connectors, such as posts or pins 31, extend between a first end 26a of the inner valve body 26 and the mounting surface 27 at a second end 26b of the inner valve body 26. Electrical connectors, such as wires 84a, extend from the pins 31 extending outwardly from the first end 26a of the inner valve body 26, and electrically connect the pins 31 to a source of electrical power (not shown).

A substantially cylindrical stepped bore 34 is formed in a first end 26a of the inner valve body 26. A radially inwardly and circumferentially extending flange 35 is formed at a first end of the bore 34. A first shoulder 36 is defined between a first diameter portion 34a and a second diameter portion 34b of the bore 34, wherein the first diameter portion 34a is larger than the second diameter portion 34b. A second shoulder 38 is defined between the second diameter portion 34b and a third diameter portion 34c of the bore 34, wherein the second diameter portion 34b is larger than the third diameter portion 34c. A third shoulder 39 is defined between the third diameter portion 34c and a fourth diameter portion 34d of the bore 34, wherein the third diameter portion 34c is larger than the fourth diameter portion 34d. A transverse fluid passageway 40 (see FIG. 6) is formed through a side wall of the inner valve body 26 between the circumferentially extending groove 32 and the third diameter portion 34c of the bore 34.

An axially extending fluid passageway 42 (see FIG. 7) is formed through an end wall of the inner valve body 26 between the fourth diameter portion 34d of the bore 34 and a second end 26b of the inner valve body 26. A transverse actuator pin slot 43 (see FIG. 7) is formed through a side wall of the inner valve body 26 within a seal cavity 68, described below. The microvalve 44 may be mounted to the mounting surface 27 at the second end 26b of the inner valve body 26 by any suitable method, such as with solder. The illustrated inner valve body 26 is preferably formed from steel. Selected portions of the inner valve body 26 may be nickel plated and/or gold plated. Alternatively, the inner valve body may be formed from any desired metal, metal alloy, and non-metal material, and selected portions may be nickel plated, gold plated, and/or plated with other metals and metal alloys.

A generally cup-shaped cap 46 is attached to an outside surface of the inner valve body 26 at the second end 26b thereof. The cap 46 has a substantially cylindrical outer surface and includes an opening 46a in an end wall thereof that defines a flow path for fluid between the microvalve 44 and the fluid outlet 21. An interior of the cap 46 defines a cavity 48 within which the microvalve 44 is mounted. The illustrated cap 46 is preferably formed from glass filled nylon. Alternatively, the cap 46 may be formed from any desired polymer or other material.

The valve seat member 50 is substantially cylindrical, has a first end 50a and a second end 50b, and has an axially extending passageway 52 that extends from the first end 50a to the second end 50b. An annular valve seat 54 extends outwardly from a surface of the first end 50a of the valve seat member 50 about the axially extending passageway 52. The illustrated valve seat member 50 is preferably formed from metal. Alternatively, the valve seat member 50 may be formed from any other desired material, such as metal alloy and non-metal material.

A shoulder 56 is defined between a first outside diameter portion 51a and a second outside diameter portion 51b of the valve seat member 50, wherein the first outside diameter portion 51a is larger than the second outside diameter portion 51b. The valve seat member 50 is mounted within the bore 34 such that the shoulder 56 on the valve seat member 50 engages the third shoulder 39 of the bore 34. In the illustrated embodiment, the valve seat member 50 is press-fit within the fourth diameter portion 34d of the bore 34. Additionally, an annular fluid passageway 57 is formed between the third diameter portion 34c of the bore 34 and the first outside diameter portion 51a of the valve seat member 50.

A substantially cylindrical electrical cap 60 is attached to the inner valve body 26 at the first end 26a thereof. The electrical cap 60 has a first end 60a and a second end 60b, and an electrical chamber 62 formed in the first end 60a thereof. A cap seal cavity 64 is formed in the second end 60b of the electrical cap 60 and includes a substantially cylindrical first cavity portion 64a and a substantially cylindrical second cavity portion 64b centrally formed in a surface of the first cavity portion 64a. A plurality of pin holes (not shown) is formed through the second end 60b of the electrical cap 60, through which the electrical pins 31 extend.

A shoulder 66 is defined between a first outside diameter portion 61a and a second outside diameter portion 61b of the electrical cap 60, wherein the first outside diameter portion 61a is smaller than the second outside diameter portion 61b. The second outside diameter portion 61b of the electrical cap 60 is mounted within the bore 34 of the inner valve body 26 such that the shoulder 66 on the electrical cap 60 engages an inside surface of the flange 35. The seal cavity 68 is defined between the inner valve body 26 and the electrical cap 60. The illustrated electrical cap 60 is preferably formed from plastic. Alternatively, the electrical cap 60 may be formed from any desired material.

A multi-function seal 70 (see FIGS. 6, 7, 12, and 13) is disposed in the seal cavity 68 and includes an annular body 71 and a radially inwardly extending arm 72 terminating in a valve closure member 74. An actuator pin 80 is mounted in an axially extending bore 72a formed in the arm 72 and extends radially outwardly of the multi-function seal 70, and through the transverse actuator pin slot 43 formed through a side wall of the bore 34 within the seal cavity 68. The illustrated multi-function seal 70 also includes a plurality of radially inwardly extending electrical pin tabs 76 having pin apertures 78 formed therein. The illustrated actuator pin 80 is preferably formed from stainless steel. Alternatively, the actuator pin 80 may be formed from any desired metal, metal alloy, and non-metal material.

Advantageously, the multi-function seal 70 provides three fluid-tight seals. First, a fluid-tight seal is provided between the valve closure member 74 and the valve seat 54 of the valve seat member 50. Second, the body 71 provides a fluid-tight seal between the inner valve body 26 and the electrical cap 60. Third, the pin tabs 76 provide fluid-tight seals around the pins 31.

The multi-function seal 70 is preferably formed from an elastomeric material, such as Neoprene, Nitrile, Silicon, EPDM rubber, and the like. Alternatively, the multi-function seal 70 may be formed from any desired elastomeric material.

A position sensor 82 may be mounted in the electrical chamber 62 formed in the first end 60a of the electrical cap 60. Electrical connectors, such as wires 84b, extend from the position sensor 82 and electrically connect the position sensor 82 to a controller (not shown) and to the source of electrical power (not shown). The position sensor 82 may be any desired position sensor configured to detect the rotation of a split sleeve 96, described in detail below.

Referring to FIGS. 9 and 10, a substantially cylindrical valve retainer 86 is attached to the outer valve body 14. The valve retainer 86 has a first end 86a and a second end 86b defining a circumferentially extending and substantially rectangular flange 88, and an axially extending passageway 90 formed therethrough. A circumferentially extending groove 92 is formed on an outside surface of the valve retainer 86 near the first end 86a thereof and a first transverse passageway 93 may be formed through a side wall of the valve retainer 86 through which the wires 84a and 84b extend. A second transverse passageway 94 may also be formed through a side wall of the valve retainer 86 through which the actuator pin 80 extends. The valve retainer 86 may be attached to the outer valve body 14 by any desired means, such as by welding or with threaded fasteners 95. The illustrated valve retainer 86 is preferably formed from aluminum. Alternatively, the valve retainer 86 may be formed from any desired metal, metal alloy, and non-metal material, such as plastic.

Figure 11:
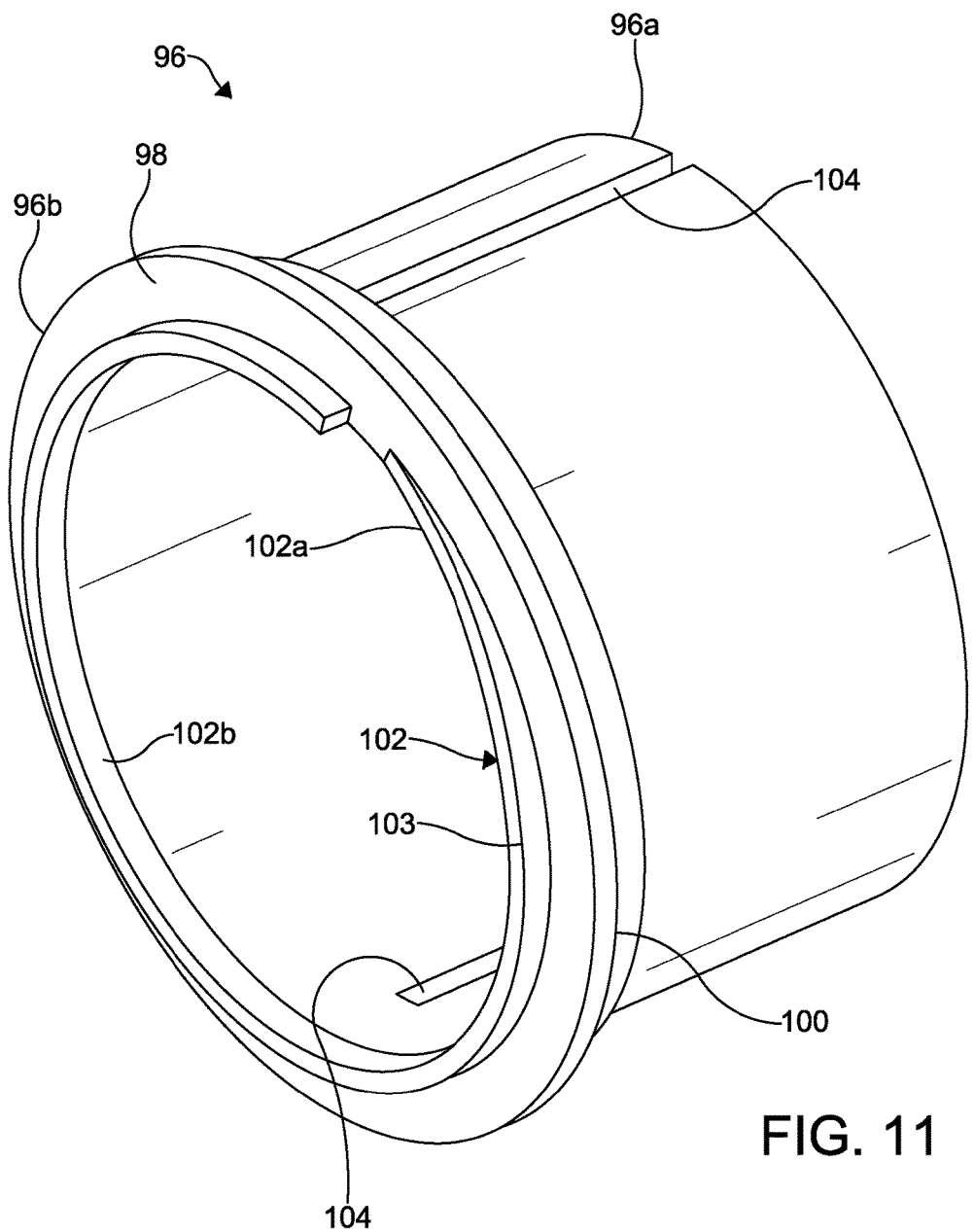
FIG. 11 is a perspective view of the split sleeve illustrated in FIGS. 1-4.
Figure 13:
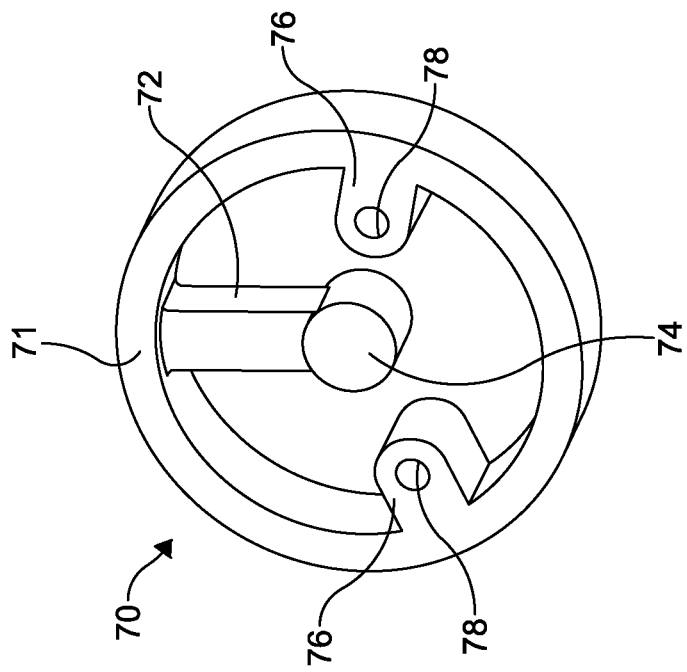
FIG. 13 is a perspective view of the multi-seal member illustrated in FIGS. 3, 4, 6, 7, 9, 10, and 12.
Figure 12:
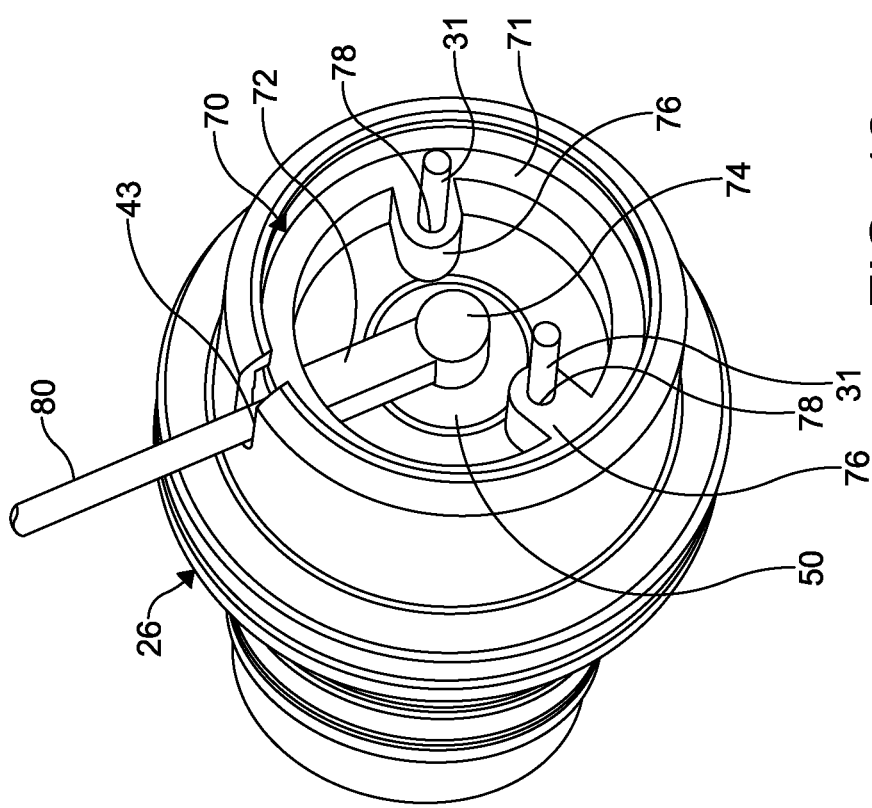
FIG. 12 is a perspective view of the inner valve body illustrated in FIGS. 2 through 7.

As best shown in FIG. 11, the substantially cylindrical split sleeve 96 includes a first end 96a and a second end 96b defining a circumferentially extending flange 98. The flange 98 is stepped and defines a shoulder 100. An annular cam member or ramp 102 is formed on the flange 98 and extends axially outwardly therefrom. An axial end surface of the ramp 102 defines a cam surface 103. The ramp 102 includes a tapered ramp portion 102a and a second portion 102b having a substantially uniform height from the flange 98. The tapered portion 102a transitions from an axial end surface of the flange 98 to the height of the second portion 102b. One or more axially extending expansion slots 104 are formed in a side wall of the split sleeve 96. A circumferentially and radially inwardly extending ridge 106 may be formed on an inside surface of the side wall of the split sleeve 96 (see FIGS. 9 and 10). The split sleeve 96 is movably mounted about the valve retainer 86 such that the ridge 106 is positioned in the groove 92 formed on the outside surface of the valve retainer 86. The illustrated split sleeve 96 is preferably formed from brass. Alternatively, the split sleeve 96 may be formed from any desired metal, metal alloy, and non-metal material.

The conventional control knob 12 has a collar 12a that is attached about the outside surface of the side wall of the split sleeve 96 such that the collar 12a engages the shoulder 100 of the split sleeve 96 and such that rotational movement of the control knob 12 also moves the split sleeve 96 about the valve retainer 86. The illustrated control knob 12 is preferably formed from plastic. Alternatively, the control knob 12 may be formed from any desired material.

The inner valve body 26, the valve seat member 50, the multi-function seal 70, the valve retainer 86, and the split sleeve 96 combine to define the first stage mechanical valve 110.

In operation, a user may turn the control knob 12 clockwise, which also rotates the attached split sleeve 96 clockwise. The cam surface 103 of the ramp 102 engages the actuator pin 80 and urges the actuator pin 80 toward the outer valve body 14, i.e., in the direction of the arrow 112 (see FIGS. 6, 7, 9, and 10), and thus lifts the valve closure member 74 off of the valve seat 54 allowing gas to flow from the fluid inlet 19, through the transverse fluid passageway 40, the annular fluid passageway 57, the seal cavity 68, the valve seat 54, and through the fluid passageway 42 to the microvalve 44, i.e., in the direction of the arrows 114 (see FIGS. 6 and 7). The microvalve 44 may then be modulated to very precisely control the flow of fluid outwardly through the fluid outlet 21. Significantly, the microvalve 44 additionally provides improved flame control and improved temperature control. For example, the flow of gas through the burner control valve 10 may be controlled to flow within the range of from about 5% to about 100% of a maximum flow rate of the burner control valve 10.

As the control knob 12 and the split sleeve 96 are rotated, the position sensor 82 may detect the movement and send a signal to the controller (not shown). The controller then actuates the microvalve 44, allowing gas to pass therethrough. If desired, the controller may also send a signal to actuate an electronic igniter, if provided, simultaneously with the signal to actuate the microvalve 44.

The first stage mechanical valve 110, and therefore the burner control valve 10, is thus moveable between a closed position as best shown in FIG. 6, wherein no gas is permitted to move through the valve seat 54, and an open position as best shown in FIG. 7, wherein the valve closure member 74 is moved off of the valve seat 54 and gas is permitted to flow through the valve seat 54, to the second stage microvalve 44, through which fluid flow may be very accurately controlled.

The combination of the unique first stage mechanical valve 110 and the second stage microvalve 44 in the burner control valve 10 provides a fluid control valve with an advantageous positive shut-off function. As used herein, a positive shut-off of the first stage mechanical valve 110 is defined as a leak free closed position.

Thus, a microvalve such as the microvalve 44 may be used in two-stage fluid control valves applications where internal valve leakage in not permitted, but where accurate fluid flow control, such as provided by the microvalve 44, is required.

It has been shown that a force of about 0.1 Newton on the actuator pin 80 is sufficient to urge the actuator pin 80 in the direction of the arrow 112, thus lifting the valve closure member 74 off of the valve seat 54 a distance of about 0.4 mm; i.e., the open position.

If desired, a temperature sensor, such as a thermocouple 120, may be mounted in a gas oven 122 as schematically shown in FIG. 10. With the thermocouple 120, the burner control valve 10 may be configured as a closed loop system that may be controlled by a temperature of the gas oven 122 to which the burner control valve 10 is mounted.

Figure 14:
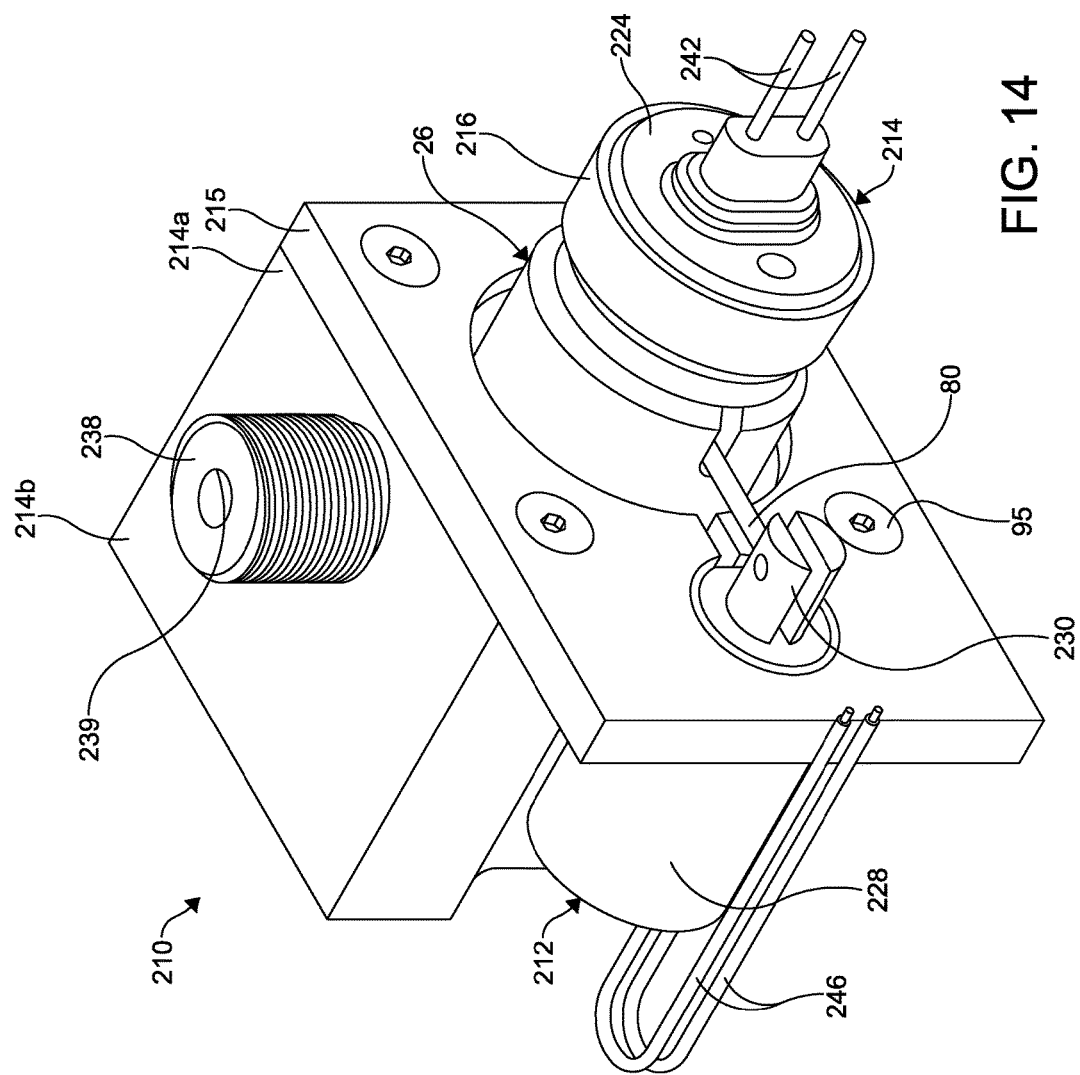
FIG. 14 is a perspective view of a second embodiment of an improved two-stage fluid control valve in accordance with this invention.
Figure 15:
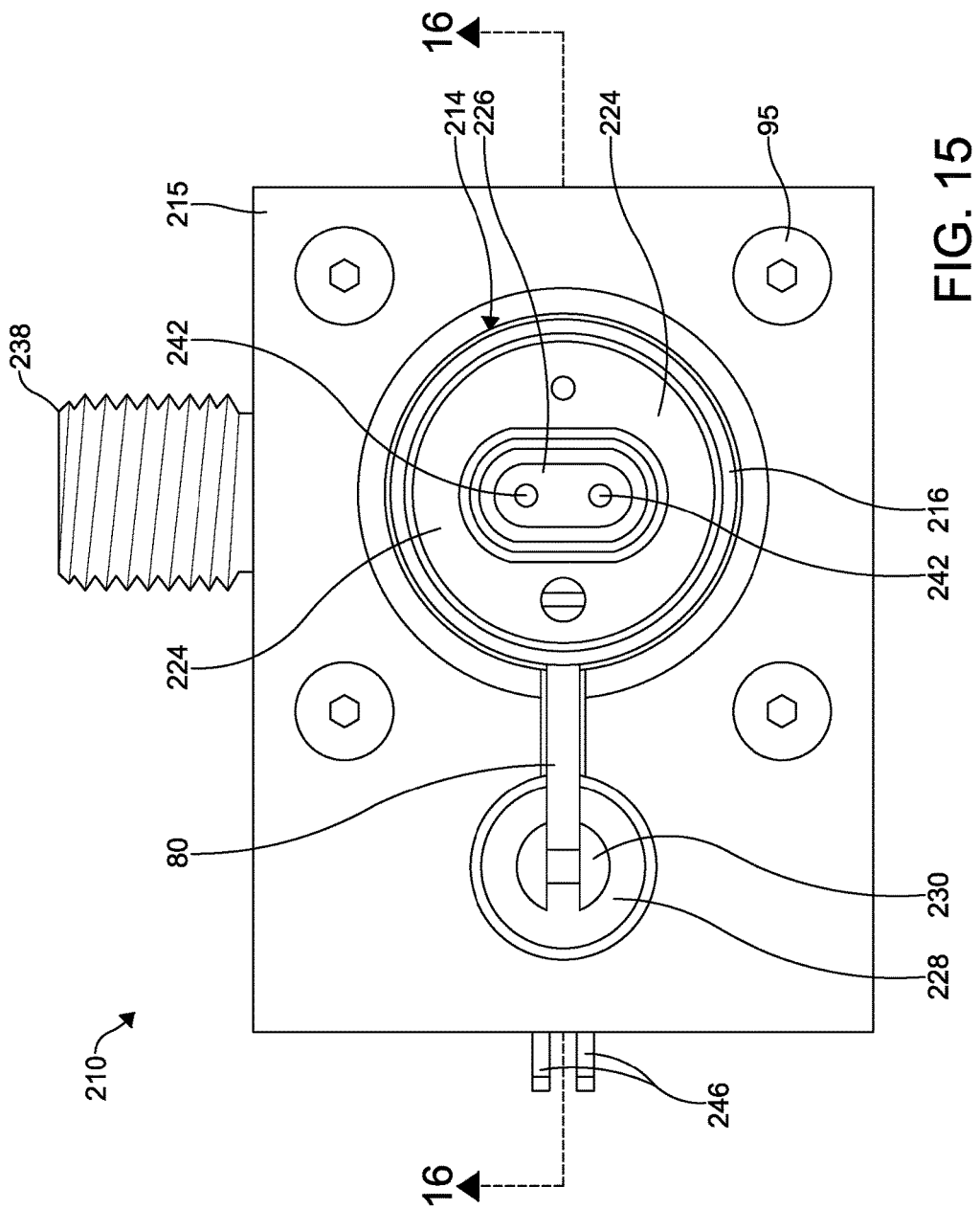
FIG. 15 is an end view of the improved two-stage fluid control valve illustrated in FIG. 14.

Referring now to FIGS. 14 through 16, a second embodiment of the improved fluid control valve is also configured as a burner control valve for a gas range (not shown) or a gas oven 122 and shown at 210. Alternatively, the illustrated burner control valve 210 may be configured for use in other applications, such as for use a gas mass flow controller to control the flow of process gas in a silicon fabrication process. In such an application, fluid pressure at a fluid inlet 239 may be about 90 to 110 psi. Thus, a pressure force acting on the valve closure member 74 seated on the valve seat 54 may be about 1 to 3 Newtons. A corresponding force of greater than about 1 to 3 Newtons is thus required to overcome the fluid pressure at the fluid inlet 239 and to urge the actuator pin 80 off of the valve seat 54.

The burner control valve 210 is similar to the burner control valve 10, but is actuated by a solenoid 212. The burner control valve 210 includes an outer valve body 213 that is substantially similar to the outer valve body 14, has a substantially rectangular prism shape, a first end 213a, and a second end 213b. The substantially cylindrical stepped bore 16 is formed in the first end 213a thereof. A fluid inlet fitting 238 and a fluid outlet fitting 240 may extend outwardly from the outer valve body 213 and define a fluid inlet 239 and a fluid outlet 241, respectively. The fluid inlet 239 and the fluid outlet 241 outlet fitting are in fluid communication with the bore 16. If desired, the inlet and outlet fittings 238 and 240, respectively, may be attached to the outer valve body 213 by a threaded connection. Additionally, the inlet and outlet fittings 238 and 240 may have external threads.

The burner control valve 210 further includes the inner valve body 26, the cap 46, the valve seat member 50, the microvalve 44, and the multi-function seal 70, all described in detail above.

A substantially cylindrical electrical cap assembly 214 includes a cap body 216 having a first end 216a and a second end 216b, and an electrical chamber 218 formed in the first end 216a thereof. A cap seal cavity 220 is formed in the second end 216b of the electrical cap body 216 and includes a substantially cylindrical first cavity portion 220a and a substantially cylindrical second cavity portion 220b centrally formed in a surface of the first cavity portion 220a. A plurality of pin holes (not shown) is formed through the second end 216b of the electrical cap body 216, through which the electrical pins 31 extend.

The cap body 216 includes a first outside diameter portion 217a, a second outside diameter portion 217b, and a third outside diameter portion 217c. A shoulder 222 is defined between the second outside diameter portion 217b and the third outside diameter portion 217c, wherein the second outside diameter portion 217b is smaller than the third outside diameter portion 217c. The third outside diameter portion 217c of the electrical cap body 216 is mounted within the bore 34 of the inner valve body 26 such that the shoulder 222 on the electrical cap body 216 engages an inside surface of the flange 35. The seal cavity 221 is defined between the inner valve body 26 and the electrical cap body 216.

The electrical cap assembly 214 also includes a cap 224 mounted with and closing the first end 216a of the cap body 216. An electrical connector assembly 226 is attached to the cap 224 and to electrical connectors, such as wires 242 that extend from the connector assembly 226 to the source of electrical power (not shown). Wires 244 also extend from the pins to the electrical connector assembly 226.

The solenoid 212 may be attached to the cover plate 215 and includes a solenoid housing 228. A solenoid coil (not shown) may be mounted in a coil housing (not shown) in a conventional manner. An axially moveable plunger 230 is slidably mounted within the coil of the solenoid 212. The plunger 230 extends outwardly of the solenoid 212 and is attached to the actuator pin 80. Electrical connectors, such as the wires 246, extend from the solenoid 212 to the source of electrical power (not shown).

To operate the improved burner control valve 210, a user may actuate the solenoid 212 by engaging an actuator switch (not shown). Upon actuation, the solenoid plunger 230 is urged inwardly into the solenoid 212, thus also urging the attached end of the actuator pin 80 in the direction of the arrow 232 (to the left when viewing FIG. 16. In the manner described above, the valve closure member 74 is thus lifted off of the valve seat 54 allowing gas to flow from the fluid inlet 239, through the transverse fluid passageway 40, the annular fluid passageway 57, the seal cavity 221, the valve seat 54, and through the fluid passageway 42 to the microvalve 44. The microvalve 44 may then be modulated in a known manner to control the flow of fluid outwardly through the fluid outlet 241. As described above, the microvalve 44 additionally provides improved flame control and improved temperature control.

Similar to the burner control valve 10, the inner valve body 26, the valve seat member 50, the multi-function seal 70, and the solenoid 212 of the burner control valve 210 combine to define a first stage mechanical valve 234.

As described above, the burner control valve 210 may be mounted to a gas oven, such as the gas oven 122. The thermocouple 120 may be mounted in the gas oven 122 as schematically shown in FIG. 16. With the thermocouple 120, the burner control valve 210 may be configured as a closed loop system that may be controlled by a temperature of the gas oven 122.

Figure 17:
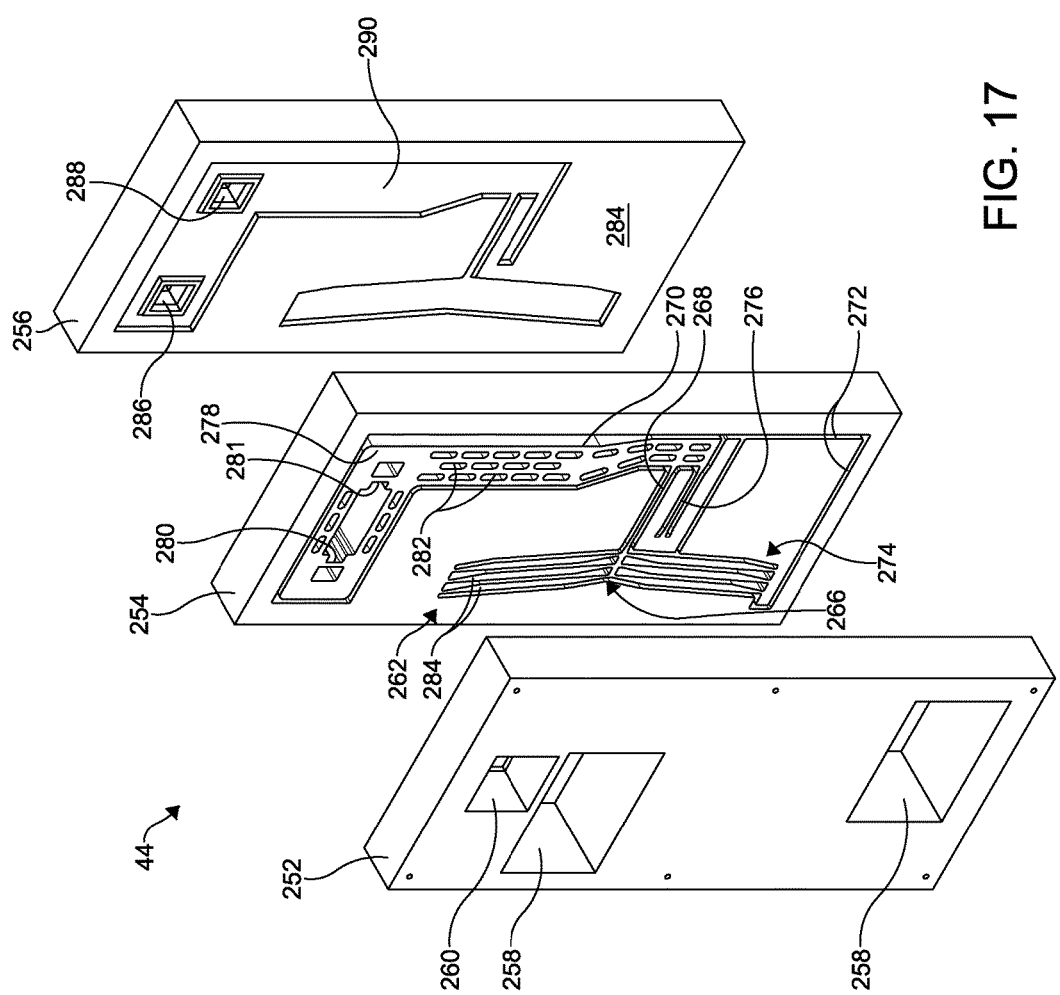
FIG. 17 is a perspective view of a microvalve that may be used in the first and second embodiments of the improved fluid control valves illustrated in FIGS. 1 and 14.

FIG. 17 is a perspective view of the microvalve 44 used in the embodiments of the improved burner control valves 10 and 210 described herein. The illustrated microvalve 44 includes a cover plate 252, an intermediate plate 254, and a base plate 256.

The cover plate 252 includes electrical ports 258 for passing respective electrical wires 259 therethrough for connection to respective bond pads (not shown) formed on spaced apart portions of the intermediate plate 254, thereby permitting an electric current to pass therebetween upon connection to, and application of, electrical power from a source of electrical power (not shown). The cover plate 252 also includes a common fluid port 260.

The intermediate plate 254 includes an actuator 262 having a plurality of actuator ribs 264 formed in herringbone pattern. A central rib region 266 of the ribs 264 is joined to a moveable central spine 268, and a displaceable actuator arm 270 is operatively coupled to the spine 268. The intermediate plate 254 may also include one or more air flow passages 272 for purging air from an open end rib region 274 of the ribs 264 and out of the microvalve 44.

The actuator arm 270 includes a pivot anchor or hinge 276 that bends or flexes to accommodate arcuate movement of the actuator arm 270 in a plane that is substantially parallel to the cover plate 252, the intermediate plate 254, and the base plate 256. The actuator arm 270 also includes a valve element 278 having slots 280 and 281 for controlling the flow of fluid through the microvalve 44 and a plurality of pressure equalization openings 282 for reducing or preventing pressure imbalances of the valve element 278 that would otherwise tend to cause movement of the actuator arm 270 out of the plane of normal arcuate motion during actuation and un-actuation thereof.

As used in the description of the invention and the appended claims, the terms "un-actuated" and "un-actuation" are defined as a steady-state condition of the microvalve device prior to application of electrical power to; i.e., prior to the actuation of the microvalve device actuator.

An inner surface 284 of the base plate 256 includes a plurality of fluid ports for permitting passage of fluid through the microvalve 44, including a normally open fluid port 286, and a normally closed fluid port 288. An inner surface 284 of the base plate 256 also includes an actuator cavity 290.

During actuation of the microvalve 44, the ribs 264 are heated by passing an electrical current therethrough. The ribs 264 then undergo thermal expansion and elongate, which urges the spine 268 and the attached actuator arm 270 away from the ribs 264 (to the right when viewing FIG. 17). The actuator arm 270 then bends or flexes at the hinge 276 to accommodate movement of the spine 268 thereby causing the valve element 278, and its slots 280 and 281 to move in the plane of normal motion along an arcuate path (to the right when viewing FIG. 17) to a stressed position, which closes the normally open fluid port 286 and opens the normally closed fluid port 288.

When the electrical current is removed from the ribs 264, the ribs 264 cool and contract, urging the central spine 268 back toward the ribs 264 (to the left when viewing FIG. 17). The actuator arm 270 and valve element 278 then return to an un-actuated position, such as shown in FIG. 17, wherein the normally open fluid port 286 is again open, and normally closed fluid port 288 is again closed.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A two-stage fluid control valve comprising:
   a first stage mechanical control valve movable between an open position and a leak-free closed position; and
   a second stage microvalve configured to control the flow of fluid through a fluid outlet of the two-stage fluid control valve when the first stage mechanical control valve is in the open position;
   wherein a seal is disposed between the first stage mechanical control valve and the second stage microvalve, and wherein the seal is configured to provide a fluid-tight seal between the first stage mechanical control valve and the second stage microvalve such that fluid is prevented from flowing therebetween when the first stage mechanical control valve is in the leak-free closed position.

2. The two-stage fluid control valve according to claim 1, wherein the two-stage fluid control valve is configured to function as a control valve for a burner in one of a gas range and a gas oven, and wherein the microvalve is configured to control one of a flame and temperature of the burner.

3. The two-stage fluid control valve according to claim 1, wherein the first stage mechanical valve includes:
   an outer valve body having a bore formed therein;
   an inner valve body disposed in the bore of the outer valve body and having a longitudinally extending bore formed therein; and
   a valve seat member mounted in the bore of the inner valve body, the valve seat member having an axially extending passageway formed therein and an annular valve seat extending outwardly about the axially extending passageway at one end thereof, the axially extending passageway defining a fluid flow path between a fluid inlet and the fluid outlet of the two-stage fluid control valve.

4. The two-stage fluid control valve according to claim 3, wherein the bore in the inner valve body is formed in a first end thereof, wherein a second end of the inner valve body defines a mounting surface for the second stage microvalve, and wherein an electrical cap is attached to the inner valve body at the first end thereof.

5. The two-stage fluid control valve according to claim 4, wherein a seal cavity is defined between the first end of the inner valve body and the electrical cap, and wherein a multi-function seal is disposed in the seal cavity.

6. The two-stage fluid control valve according to claim 5, wherein the multi-function seal includes:
an annular body and a radially inwardly extending arm terminating in a valve closure member;
an actuator pin mounted in an axially extending bore formed in the arm and extending radially outwardly of the multi-function seal, and further extending outwardly through a side wall of the inner valve body; and
a plurality of radially inwardly extending electrical pin tabs having pin apertures formed therein.

7. The two-stage fluid control valve according to claim 6, wherein the multi-function seal is configured to provide a fluid-tight seal between the valve closure member and the valve seat of the valve seat member.

8. The two-stage fluid control valve according to claim 7, wherein the annular body is configured to provide a fluid-tight seal between the inner valve body and the electrical cap.

9. The two-stage fluid control valve according to claim 8, wherein the pin tabs are configured to provide fluid-tight seals around electrical pins that extend outwardly from the first end of the inner valve body and electrically connect the second stage microvalve to a source of electrical power.

10. The two-stage fluid control valve according to claim 9, further including a generally cup-shaped cap attached to an outside surface of the inner valve body at the second end thereof, the cap having an opening in an end wall thereof that defines a flow path for fluid between the second stage microvalve and the fluid outlet.

11. The two-stage fluid control valve according to claim 10, further including:
a substantially cylindrical valve retainer attached to the outer valve body; and
a substantially cylindrical split sleeve rotatably mounted about the valve retainer;
wherein the split sleeve includes a first end and a second end defining a circumferentially extending flange having an annular cam member formed thereon, wherein an axial end surface of the cam member defines a ramp having a cam surface thereon, wherein the ramp engages the actuator pin, and wherein rotational movement of the split sleeve causes the ramp to engage the actuator pin and move the actuator pin between a closed position, an open position, and a plurality of positions intermediate the closed position and the open position.

12. The two-stage fluid control valve according to claim 11, further including a solenoid attached to the outer valve body and to the actuator pin, the solenoid configured to actuate the first stage mechanical control valve by moving the actuator pin.

13. A two-stage burner control valve for a gas range and a gas oven comprising:
a first stage mechanical control valve movable between an open position and a leak-free closed position; and
a second stage microvalve configured to control the flow of gas through a fluid outlet of the two-stage burner control valve when the first stage mechanical control valve is in the open position;
wherein the second stage microvalve is further configured to control one of a flame and temperature of the burner.

14. The two-stage burner control valve according to claim 13, further including an actuator configured to move the first stage mechanical control valve between a closed position, an open position, and a plurality of positions intermediate the closed position and the open position.

15. The two-stage burner control valve according to claim 14, wherein the actuator is a solenoid.

16. The two-stage burner control valve according to claim 15, wherein the first stage mechanical valve includes:
an outer valve body having a bore formed therein;
an inner valve body disposed in the bore of the outer valve body and having a longitudinally extending bore formed therein; and
a valve seat member mounted in the bore of the inner valve body, the valve seat member having an axially extending passageway formed therein and an annular valve seat extending outwardly about the axially extending passageway at one end thereof, the axially extending passageway defining a fluid flow path between a fluid inlet and the fluid outlet of the two-stage fluid control valve;
wherein the bore in the inner valve body is formed in a first end thereof, wherein a second end of the inner valve body defines a mounting surface for the second stage microvalve, and wherein an electrical cap is attached to the inner valve body at the first end thereof.

17. The two-stage burner control valve according to claim 16, wherein a seal cavity is defined between the first end of the inner valve body and the electrical cap, wherein a multi-function seal is disposed in the seal cavity, and wherein the multi-function seal includes:
an annular body and a radially inwardly extending arm terminating in a valve closure member;
an actuator pin mounted in an axially extending bore formed in the arm and extending radially outwardly of the multi-function seal, and further extending outwardly through a side wall of the inner valve body; and
a plurality of radially inwardly extending electrical pin tabs having pin apertures formed therein.

18. The two-stage burner control valve according to claim 17, wherein the multi-function seal is configured to provide:
a fluid-tight seal between the valve closure member and the valve seat of the valve seat member;
a fluid-tight seal between the inner valve body and the electrical cap; and
fluid-tight seals around electrical pins that extend outwardly from the first end of the inner valve body and electrically connect the second stage microvalve to a source of electrical power.

\* \* \* \* \*